United States Patent [19]
Burbach

[11] 3,726,239
[45] Apr. 10, 1973

[54] METHOD AND APPARATUS USEFUL IN COMBUSTION GAS PURIFICATION

[75] Inventor: Henry Edward Burbach, Avon, Conn.

[73] Assignee: Combustion Engineering, Inc., Windsor, Conn.

[22] Filed: Dec. 29, 1971

[21] Appl. No.: 213,439

[52] U.S. Cl..................................110/1 J, 110/49 R
[51] Int. Cl.................................................F23b 1/00
[58] Field of Search......................110/1 J, 1 K, 49 R

[56] References Cited

UNITED STATES PATENTS

| | | | |
|---|---|---|---|
| 3,320,906 | 5/1967 | Domahidy | 110/1 |
| 3,520,649 | 7/1970 | Tomany et al. | 110/1 X |
| 3,693,557 | 9/1972 | Makuch | 110/1 X |

Primary Examiner—Kenneth W. Sprague
Attorney—Eldon H. Luther et al.

[57] ABSTRACT

Method and apparatus are disclosed that are useful in the operation of a system in which combustion gases from a steam generator are cleansed of their sulfurous and particulate impurities by wet scrubbing prior to being discharged to the atmosphere. Some of the processed gas is recycled through the scrubber under conditions of low load in order that the effectiveness of the scrubber will not be impeded by reduced gas flow.

8 Claims, 1 Drawing Figure

PATENTED APR 10 1973 3,726,239
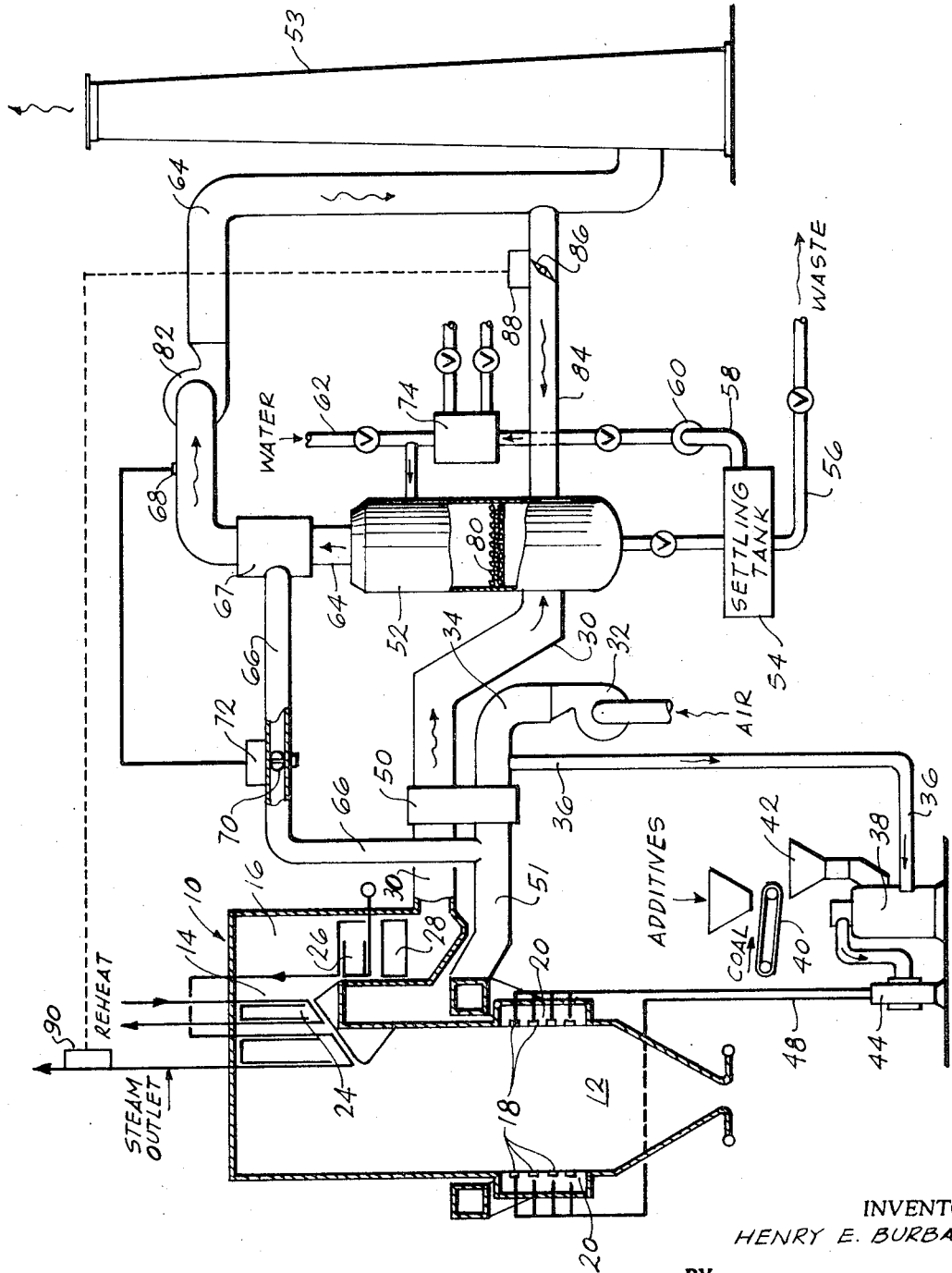
INVENTOR.
HENRY E. BURBACH
BY
John F. Carney
ATTORNEY

METHOD AND APPARATUS USEFUL IN COMBUSTION GAS PURIFICATION

BACKGROUND OF THE INVENTION

Air pollution has become a major problem in recent years and there is currently much time, effort and expense being put forth to devise economical schemes for reducing this pollution. One of the many sources of air pollution is the flue gases emitted from fuel burning equipment such as steam generating units. The sulfur oxides, $SO_2$ and $SO_3$, are of major concern as air pollutants in such flue gases. The particulate matter such as fly ash and other dust particles also contribute to the pollution problem if not completely removed. One system for cleansing flue gases of their sulfurous and particulate impurities utilizes a wet scrubber in which intimate contact of the flue gas with wash water effects the purification of the gas. The details of such a system are described in U.S. Pat. No. 3,320,906, issued May 23, 1967 to George Domahidy and assigned to the assignee of the present invention.

In practice the form of wet scrubber utilized in such a system is one in which the flue gases and wash water are passed through a filter bed within which intimate contact between the two media is effected. An effective form of wet scrubber that may be utilized in the described system is one employing a bed of marbles which, when set in motion by the flowing fluids, produces a highly efficient mixture of the wash water and the flue gas.

Problems result however in that scrubbers of this type require a certain level of bed activity in order to effectively purify the gas and therefore are efficient only over a narrow range of gas flows. In the past this problem has been overcome by utilizing a plurality of scrubbers, each being effective to operate on a limited portion of the total gas flow with the number of scrubbers being operative at any one time being dependent upon the load conditions of the steam generator. Organizations of this type are undesirable for the reason that they entail elaborate control and external piping requirements that render their cost excessive. Moreover, it is contrary to best operating procedures to intermittantly remove apparatus from service.

SUMMARY OF THE INVENTION

According to the present invention the combustion gas discharge system of a steam generator is provided with gas purification apparatus including a wet scrubber having a marble bed and wherein means are provided for controllably recirculating part of the gas through the scrubber. The improved organization enables the gas flow through the scrubber bed to be maintained substantially constant over the full range of steam generator operation thereby permitting the activity of the filter bed to be maintained at its most effective level.

It is therefore an object of the present invention to provide an apparatus and method of operating the same for economically removing pollutants from the combustion gas evolving from fuel burning processes.

Another object of the invention is to provide an improved method and apparatus for reacting and removing sulfur and other compounds as well as particulate matter from combustion gases.

A more specific object of the invention is to provide a method and apparatus for operating a marble bed wet scrubber in a manner that permits bed activity to be maintained at its most effective level over the full range of steam generator operation.

Still another object of the invention is to provide means for recirculating a portion of the processed gas by means of which the gas is again streated in the scrubber to a greater degree of purification.

For a better understanding of the invention, its operating advantages and the specific objects obtained by its use, reference should be made to the accompanying drawing and description which relate to a preferred embodiment of the invention.

The single FIGURE is a schematic representation of a pulverized coal fired steam generator having a flue gas purification system according to the present invention.

DESCRIPTION OF THE PREFERRED EMBODIMENT

The drawing and the description herein are directed toward a pulverized coal fired steam generator organization having a gas purification system as described in detail in U.S. Pat. No. 3,320,906. Only so much of the description contained in that patent will be repeated here as is required for an understanding of the present invention.

In the drawing there is shown a steam generating unit 10 including a furnace portion 12, a horizontal gas pass 14 and a rear gas pass 16. The furnace portion 12 contains a plurality of burners 18 which feed a mixture of pulverized coal and primary combustion air into the furnace chamber. Secondary combustion air is fed to the furnace through the wind boxes 20. The products of combustion produced in the furnace rise through the furnace and enter the horizontal gas pass 14 in which they contact the finishing superheater 22 and the reheater 24. The products of combustion or flue gases then enter the rear gas pass 16 and contact, in turn, the primary superheater 26 and the economizer 28 after which the flue gases enter the duct 30.

The combustion air is supplied to the furnace by means of the forced draft fan 32. A portion of the air from the fan discharge duct 34 is withdrawn through duct 36 and fed to the pulverizer 38. Coal is also fed to the pulverizer by means of the conveyor 40 and the chute 42. The pulverizer which may be of a type such as illustrated in U.S. Pat. No. 2,848,170, issued Aug. 19, 1958 to J. Crites, pulverizes the coal and mixes it with the primary combustion air from duct 36. This mixture of pulverized coal and primary combustion air is conveyed to the inlet of the exhauster fan 44 via the conduit 46. From the exhauster fan 44 the coal-air mixture is conveyed through duct 48 to the burners 18. The remaining combustion air from the forced draft fan 32 passes through the conventional regenerative air preheater 50 and then through duct 51 to the wind boxes 20 from which the air enters the furnace. The air preheater 50 serves to extract the heat from the flue gases in duct 30 and transfer the heat to the secondary combustion air in duct 51. U.S. Pat. No. 2,911,202 is illustrative of the type of air preheater which may be employed.

During the course of the combustion process the sulfur contained in the fuel is converted to $SO_2$ and $SO_3$ and water vapor whose serious corrosive effects are avoided by the addition of oxides, hydroxides and carbonates of alkali and alkaline earth metals to the combustion gas stream as described in U.S. Pat. No. 3,320,906. In addition a wet scrubber 52 is interposed between the steam generating unit and the stack 53 in order to scrub the combustion gases prior to their discharge to the atmosphere. The wet scrubber 52 not only removes the sulfate and sulfite particles which have been formed in the steam generator by the reaction of the alkaline additives with sulfur compounds but also effects an additional reaction of the additives with the sulfur compounds to remove most of the latter from the the combustion gases.

One form of wet scrubber found to be most effective for purifying the combustion gases prior to their discharge from the stack 53 is one incorporating a bed 80 comprised of discrete spheroidal marbles through which the combustion gases are caused to flow and to be intimately mixed with wash water admitted thereto. In practice the flow velocity of the gas through the marble bed 80 must be maintained within certain prescribed limits. For example, gas flow velocity is ideally maintained between 500 and 550 feet per minute in order that the marbles in the bed will be agitated to such a degree as to effect best results. Adequate results will be obtained at gas flow velocities between 350 feet per minute and 500 feet per minute. If the gas velocity falls below 350 feet per minute the marble bed cannot be agitated to any significant degree such that adequate gas-wash water contact is not usually attainable.

The scrubber operates in a continuous manner with the liquid effluent from the scrubber being fed to a settling tank 54. The reaction products settle rather rapidly in the settling tank and the sludge is discharged through line 56 and disposed of. The supernatant water is drawn off the top of the settling tank through line 58 by the pump 60 and recirculated through the scrubber 52. Make-up water is added to the scrubbing system through line 62. Considerable quantities of water may be necessary in excess of that required for sulfur removal in order to keep the scrubber from clogging. The scrubbed gases are conducted from the wet scrubber through duct 64 to the stack 53.

To reduce the effects of a water vapor plume the gases emanating from the scrubber 52 are preheated by extracting air from duct 51 via duct 66 and introducing it into duct 64 in direct mixing relation with the combustion gases passing therethrough. The preheated air is introduced into duct 64 at the enlarged portion or chamber 67. As illustrated, the preheated air duct 66 enters the chamber 67 tangentially so as to create a swirling motion of the gases to promote mixing. Various forms of mixing devices could be employed such as fixed vanes or blades in the gas flow path which causes swirling and mixing. On the other hand, perhaps no artificially induced mixing will be required. This will of course depend upon the flow rates and turbulence involved and the distance from the point of introduction to the stack.

The temperature and amount of combustion gases leaving the scrubber 52 will of course vary under certain conditions such as a change in load on the steam generator. Therefore the amount of preheated air necessary to reheat the stack gas will also vary. Means may be provided to control the reheating air such as the temperature measuring device 68 which controls the damper 70 in duct 66. This control is accomplished by means of suitable conventional control apparatus 72.

The amount of water vapor being carried over to the stack 53 can be reduced by maintaining the scrubbing water at a low temperature so as to cause the flue gases to leave the scrubber at a low temperature. This results in a lower weight of water vapor in the gases prior to reheat thus lowering the dew point temperature of the gases leaving the stack. If sufficient scrub water cooling does not take place in the settling tanks or by the addition of make-up water, a cooling heat exchanger 74 may be inserted into the scrub water circuit to provide the desired cooling.

According to the present invention the need for a plurality of scrubbers 52 in the described system is obviated by provision being made for recirculating part of the processed combustion gas under certain conditions again through the wet scrubber 52 in order to maintain the gas flow velocity substantially uniform through the marble bed 80 and, concomitantly, its effectiveness to contact wash water with the combustion gas over the full operational range of the steam generator 10. To accomplish this result a gas recirculation duct 84 is connected between the combustion gas discharge duct 64 and the wet scrubber 52. The duct 84 has its inlet end connected to the duct 64 downstream of an induced draft fan 82 and its outlet end communicating with the scrubber 52 upstream of the marble bed 80. By means of this arrangement the recirculated part of the processed combustion gas is admitted to the scrubber and caused to flow through the bed 80 in mixed relation with the raw combustion gas fed to the scrubber through duct 30.

The operation of the gas recirculation system is such as to controllably pass part of the purified combustion gas that flows through duct 64 toward the stack 53 back through the wet scrubber 52 when the flow velocity of the raw gas entering the scrubber through duct 30 is reduced below about 500 feet per minute. The controls provided to effect such controlled gas recirculation include a damper 86 disposed in the gas recirculation duct 84 having a controller 88 that is operated in response to the operation of element 90 arranged to sense the load conditions of the steam generator 10. In the illustrated embodiment the sensing element 90 is one operative to detect the steam output delivered by the unit which parameter will vary in direct proportion to the combustion gases exiting the steam generator. The controller 88 and the sensor 90 cooperate to open the damper 86 whenever the load conditions on the steam generator 10 fall below full rated value. The damper 86 is regulated in response to the signal emitted by the sensor 90 to admit processed gas in such amounts as to ideally maintain total gas flow through the bed at about 500 feet per minute. Moreover, at extremely low load conditions where flow velocities of 500 feet per minute are not possible the flow permitted by the damper 86 prevents the flow velocity from falling below 350 feet per minute, the minimum required for scrubber operation.

It will be recognized that by employing the gas recirculation system of the present invention the use of a single wet scrubber can be extended into the lower load ranges of steam generator operation. Thus, the need for incorporating a plurality of scrubbers, each being designed for reduced gas flow capacity, is avoided together with the expense attendant therewith. Alternatively, in installations where a plurality of scrubbers are employed, gas recirculation therethrough as taught by the present invention obviates the need to remove scrubbers from service over the full load range of steam generator operation.

Additionally, retreatment of a portion of the processed gas, as is characteristic of the present system, becomes effective up to the capability of the scrubber for additional gas purification. This feature is becoming increasingly more important to meet regulations which limit the amount of pollutants that can be discharged to the atmosphere.

It will be understood that various changes in the details, materials, and arrangements of parts which have been hereindescribed and illustrated in order to explain the nature of the invention, may be made by those skilled in the art within the principle and scope of the invention as expressed in the appended claims.

What is claimed is:

1. The method of operating a steam generator including a furnace in which combustion gases are produced, a wet scrubber operative when the flow of gas therethrough is above a predetermined minimum and means for conducting the processed combustion gas to the atmosphere comprising the steps of:
    a. determining the rate of flow of combustion gases to said scrubber, and
    b. recirculating a portion of the processed gas from said scrubber back through said scrubber when the rate of combustion gas flow falls below a predetermined minimum flow, the amount of processed gas recirculated being that required to raise the total flow of gas to said scrubber above said predetermined minimum.

2. The method of claim 1 including the step of controllably admitting processed gas to said scrubber in proportion to the deficiency of flow of combustion gas thereto to maintain the total gas flow at a substantially constant value above said predetermined minimum.

3. The method of claim 1 wherein the rate of flow of combustion gas to said scrubber is determined by measuring the amount of steam produced by said steam generator.

4. A fuel burning system comprising a furnace within which combustion gases are produced, a wet scrubber arranged to operate effectively when the flow of gas therethrough is above a predetermined minimum, means for conducting said combustion gases to said wet scrubber wherein the same is scrubbed with water, means for conducting the gas processed in said scrubber to the atmosphere, means for diverting a portion of said processed gas and for recirculating the same through said wet scrubber when the flow of combustion gas to said scrubber falls below a predetermined value.

5. A fuel burning system as recited in claim 4 wherein said wet scrubber comprises a bed of discrete spheroidal particles through which said combustion gas is caused to flow.

6. A fuel burning system as recited in claim 5 including duct means connecting the discharge end of said scrubber with a stack, a gas recirculation duct connected at one end to said duct means and at its other end to said scrubber upstream of the bed therein.

7. A fuel burning system as recited in claim 6 including damper means in said gas recirculation duct operated in response to an indication of combustion gas flow to said scrubber and operative to admit processed gas to said scrubber when the combustion gas flow to said scrubber falls below a predetermined value.

8. A fuel burning system as recited in claim 6 wherein said damper is closed when the flow of combustion gas to said scrubber is above about 500 feet per minute and is operative to regulate the flow of processed gas to said scrubbers to maintain a total gas velocity of about 500 feet per minute when the flow of combustion gas to said scrubber falls below said value.

* * * * *